(12) United States Patent
Hamada

(10) Patent No.: US 7,229,720 B2
(45) Date of Patent: *Jun. 12, 2007

(54) HOLOGRAM FILM HAVING IDENTIFICATION INFORMATION RECORDED THEREON AND METHOD FOR MANUFACTURING THE SAME

(75) Inventor: Satoru Hamada, Kashiwa (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/621,454

(22) Filed: Jul. 18, 2003

(65) Prior Publication Data

US 2004/0029020 A1    Feb. 12, 2004

Related U.S. Application Data

(62) Division of application No. 09/263,525, filed on Mar. 5, 1999, now Pat. No. 6,613,481.

(30) Foreign Application Priority Data

Mar. 9, 1998  (JP) .................................. 10-56470

(51) Int. Cl.
*G03H 1/30* (2006.01)

(52) U.S. Cl. .................. 430/1; 430/2; 359/25; 359/26; 283/86

(58) Field of Classification Search .................. 430/1, 430/2; 359/12, 25, 26, 35; 283/86
See application file for complete search history.

(56) References Cited

U.S. PATENT DOCUMENTS

| T861,026 I4 | 4/1969 | Harper et al. .................. 430/1 |
| 3,601,465 A | 8/1971 | Hannan ...................... 350/3.5 |
| 3,658,526 A | 4/1972 | Haugh ........................... 96/27 |
| 4,681,324 A | 7/1987 | Karabed et al. ............ 273/295 |
| 4,889,366 A | 12/1989 | Fabbiani ..................... 283/86 |
| 4,921,352 A | 5/1990 | Adolfs et al. ................ 356/347 |
| 4,988,151 A | 1/1991 | Moss ......................... 350/3.66 |
| 5,034,760 A | 7/1991 | Khait .......................... 354/105 |
| 5,116,548 A * | 5/1992 | Mallik et al. ............... 264/1.34 |
| 5,331,443 A | 7/1994 | Stanisci ......................... 359/2 |
| 5,380,047 A | 1/1995 | Molee et al. ................. 283/86 |
| 5,502,581 A | 3/1996 | Sudo et al. ................... 359/10 |
| 5,788,286 A | 8/1998 | Hunt ........................... 283/117 |
| 5,816,619 A | 10/1998 | Schaede ...................... 283/67 |
| 5,843,598 A | 12/1998 | Ueda et al. ................. 430/602 |
| 5,900,954 A | 5/1999 | Katz et al. ..................... 359/2 |
| 5,985,490 A | 11/1999 | Suga et al. ..................... 430/2 |
| 6,033,810 A | 3/2000 | Taniguchi et al. ............. 430/2 |
| 6,127,066 A * | 10/2000 | Ueda et al. .................... 430/1 |
| 6,728,014 B2 * | 4/2004 | Kodama ....................... 359/12 |

FOREIGN PATENT DOCUMENTS

| EP | 0-372-837 | | 6/1990 |
| JP | 3-55555 | | 3/1991 |
| JP | 04-237086 | * | 8/1992 |
| JP | 7-43077 | | 2/1995 |
| JP | 7-181698 | | 7/1995 |
| JP | 7-312362 | | 11/1995 |
| JP | 08-166758 | * | 6/1996 |

* cited by examiner

*Primary Examiner*—Martin Angebranndt
(74) *Attorney, Agent, or Firm*—Morgan, Lewis & Bockius LLP

(57) ABSTRACT

A simplified method is provided for recording identification information, such as a serial number or the like, in a hologram-recorded film simultaneously with hologram duplication. The method includes the steps of coupling a hologram recording film with a master hologram plate having a master hologram, the master hologram plate having a reflective area adjacent the master hologram; and directing laser beams towards the master hologram plate to induce interference between incident laser light and diffraction laser light from the master hologram in the recording film, at least some of the laser beams radiating the reflective area through a transmission type controllable display device to record a pattern in the hologram recording film corresponding to a pattern displayed at the transmission type controllable display device.

12 Claims, 2 Drawing Sheets

HOLOGRAM FILM HAVING IDENTIFICATION INFORMATION RECORDED THEREON AND METHOD FOR MANUFACTURING THE SAME

This is a divisional of application Ser. No. 09/263,525 filed on Mar. 5, 1999, now U.S. Pat. No. 6,613,481.

This application claims the benefit of Japanese Application No. 10-56470, filed in Japan on Mar. 9, 1998, which is hereby incorporated by reference.

BACKGROUND OF THE INVENTION

1. Field of the Invention

The present invention relates to a hologram film and method for manufacturing the same, and more particularly, to a hologram film having identification information or the like thereon and a method for manufacturing the same.

2. Discussion of the Related Art

Conventionally, in forming multiple duplicates of a master hologram on a recording tape (which is to be wound up on a roller, for example), each duplication has been performed by the steps of contacting the recording film with a master hologram plate and exposing it to laser radiation to induce interference between the incident laser light and diffraction light diffracted from the master plate in the corresponding region of the recording film. As a result, a plurality of duplicated holograms are formed in the recording tape at a fixed interval or at variable intervals. Such a hologram tape is utilized as is, or is cut out to produce separate hologram films each having one or more of duplicated holograms.

To identify or distinguish the duplicated hologram pattern, it is necessary to print identification information or the like, such as a serial number, identification pattern, etc., adjacent each hologram. To print such information on the hologram tape (or each of the separated hologram films), an additional printing process has been required in the conventional method.

Although Japanese Patent Application Laid-Open Publication No. 7-43077 describes a technique for recording additional holographic detection marks for the purpose of using in post-processing, if information specific to the individual hologram pattern, such as a serial number, identification pattern, etc., is to be printed adjacent the corresponding hologram pattern, it was unavoidable to have a separate printing or like process in addition to the hologram duplication process. Further, when such information is optically printed, a separate light source is necessary, as described in Japanese Patent Application No. 3-5555. Thus, the conventional method has drawbacks of a poor throughput and a higher cost due to complexities introduced by the additional step and equipment. Accordingly, it has been long desired to develop a simple and easily controllable method for printing such identification information on a hologram tape (or individual hologram film).

SUMMARY OF THE INVENTION

Accordingly, the present invention is directed to a hologram film having identification information recorded thereon and a method for manufacturing the same that substantially obviate the problems due to limitations and disadvantages of the related art.

An object of the present invention is to provide a method for manufacturing a hologram tape having a plurality of duplicated holograms recorded thereon at a fixed interval or at variable intervals, each of the holograms in the hologram tape being accompanied by identification information printed adjacent thereto.

Another aspect of the present invention is to provide a method for manufacturing a hologram film having a hologram duplicated from a master hologram, the hologram film further having identification information printed adjacent thereto.

Another object of the present invention is to provide a hologram tape having a plurality of duplicated holograms recorded thereon at a fixed interval or at variable intervals, each of the holograms in the hologram tape being accompanied by identification information printed adjacent thereto.

A further aspect of the present invention is to provide a hologram film having a hologram duplicated from a master hologram, the hologram film further having identification information printed adjacent thereto.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a hologram film including a hologram recording film; a main-hologram formed in the hologram recording film; and a sub-hologram formed in the hologram recording film adjacent to the main-hologram, the sub-hologram indicating information substantially specific to the hologram film.

In another aspect, the present invention provides a hologram tape including a hologram recording tape; a plurality of duplicated main-holograms formed in the hologram recording tape at a predetermined interval; and a plurality of sub-holograms formed in the hologram recording tape, each of the sub-holograms being disposed adjacent the respective one of the main-holograms, each sub-hologram indicating information substantially specific to the adjacent hologram.

In another aspect, the present invention provides a method for manufacturing a hologram film having a duplicate of a master hologram and identification information substantially specific to the duplicate, the method including the steps of providing a hologram recording film; positioning a master hologram plate adjacent the hologram recording film so as to produce an interference pattern in the hologram recording film under irradiation of laser light, the master hologram plate having the master hologram and an optical element thereon, the optical element being for use in printing the identification information on the hologram recording film; and printing the duplicate of the master hologram and the identification information in the hologram recording film, the master hologram being duplicated in the hologram recording film by irradiating the master hologram plate with the laser light, the identification information being printed on the hologram recording film via the optical element on the master hologram plate.

In another aspect, the present invention provides a method for manufacturing a hologram film, the method including the steps of coupling a hologram recording film with a master hologram plate having a master hologram, the master hologram plate having a reflective area adjacent the master hologram; and directing laser beams towards the master hologram plate to induce interference between incident laser light and diffraction laser light from the master hologram in the recording film, at least some of the laser beams radiating the reflective area through a transmission type controllable display device to record a pattern in the hologram recording film corresponding to a pattern displayed at the transmission type controllable display device.

In a further aspect, the present invention provides a method for manufacturing a hologram film, the method including the steps of coupling a hologram recording film with a master hologram plate having a master hologram, the master hologram plate having a reflection type controllable display device adjacent the master hologram; and directing laser beams towards the master hologram plate to induce interference between incident laser light and diffraction laser light from the master hologram in the recording film, at least some of the laser beams radiating the reflection type controllable display device so as to record a pattern in the hologram recording film corresponding to a pattern displayed at the reflection type controllable display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS AND WORKING EXAMPLES

Figure 1:
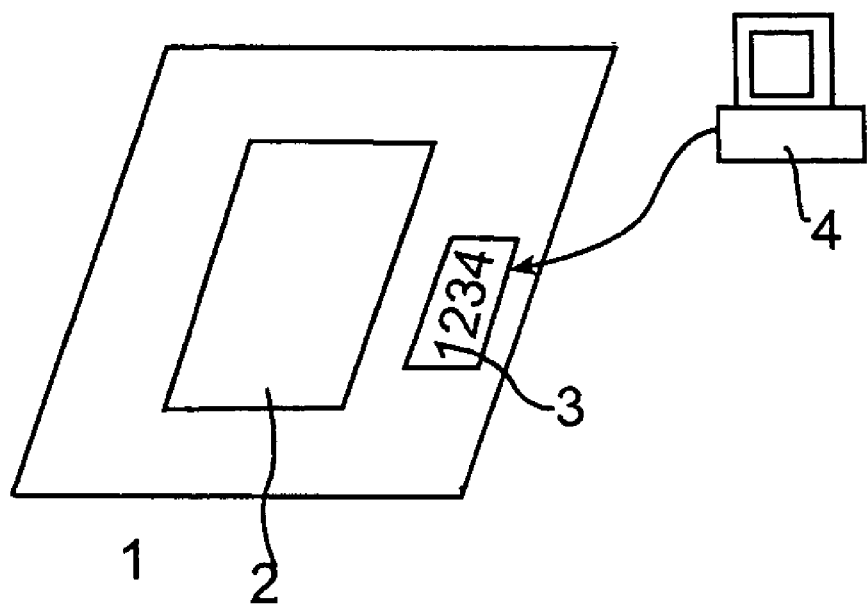
FIG. 1 is a schematic view of a reflection master hologram plate to be used in a recording method for a hologram-recorded film according to a first working example of the present invention.

A hologram tape of the present invention has a plurality of duplicated holograms recorded thereon at a fixed interval or at variable intervals. Furthermore, identification information or the like, which is substantially specific to the individual hologram, is holographically formed in the hologram tape adjacent each hologram to identify or distinguish the corresponding hologram.

Examples of such identification information include, but are not limited to, a serial number, an identification pattern, and a logo. The identification information may be specific to the adjacent hologram; i.e., different for holograms at different locations in the tape, or one or more of the holograms may carry the same identification information if desired.

A photo-polymer may be used for the material forming hologram tape, for example. Examples of the holograms to be recorded on the tape include, but are not limited to, hologram combiners and diffusion reflection holograms.

The resulting hologram tape may be cut to produce separate hologram films each having one or more of the duplicated holograms with the corresponding identification information. With the identification information, the individual holograms can easily be identified and processed.

A method for manufacturing a hologram tape or film according to the present invention includes the steps of coupling a hologram recording film with a master hologram plate (directly or via a transparent substance disposed therebetween) and radiating laser beams towards the master hologram plate so as to induce interference between the incident light and the diffracted light from the master hologram plate in the hologram recording film, thereby exposing the hologram recording film with the interference pattern. As a result, a duplicate of the master hologram is formed in the hologram recording film. These steps may be repeated in the base tape to form multiple duplicates of the master hologram along the base tape at a fixed or variable interval.

Further, a reflective area is provided in the master hologram plate adjacent to the master hologram to be duplicated, and a transmission liquid crystal display (LCD) device is disposed to partially intercept the optical paths of the laser beams that reach the reflective area on the master hologram plate. When laser beams for the hologram duplication are radiated towards the hologram recording film to induce interference for hologram duplication, the laser beams at the same time irradiate the reflective area through the transmission LCD device so that information corresponding to the display pattern of the LCD device is recorded on the recording film. Alternatively, additional laser beams different from the laser beams for the hologram duplication may be used to record the information corresponding to the display pattern of the LCD device.

As a variation of the method above, before duplication of the master hologram, light capable of inactivating the hologram recording film, such as ultraviolet rays or the like, may be radiated towards the reflective area through the transmission type LCD device. This process creates an inactivate portion corresponding the display pattern of the LCD device in the hologram recording film. Thereafter, the LCD device is removed from the optical arrangement, followed by the step of hologram duplication. In this case, when the laser beams are radiated towards the hologram recording film to duplicate the master hologram, the inactivated portion is not reacted by the laser beams and, therefore, the corresponding pattern is formed in the recording film. Alternatively, additional laser beams different from the laser beams for the hologram duplication may be used to radiate the inactivated portion of the recording film to record the information corresponding to the display pattern of the LCD device.

In these aspects of the present invention, a separate reflective plate or a portion of reflection hologram master plate itself may be used as the reflective area.

In another modification, instead of positioning the LCD device in the optical paths of the laser beams, a reflective type LCD device may be disposed on the master hologram plate adjacent to the hologram to be duplicated. In this case, when the laser beams are radiated towards the master hologram plate to duplicate the master hologram, the laser beams interact with the reflective LCD device to record information corresponding to the display pattern of the reflective LCD device at the same time as hologram duplication. Alternatively, additional laser beams different from the laser beams for the hologram duplication may be used to record the information corresponding to the display pattern of the LCD device.

Because the LCD device can be easily controlled to display a desired pattern or characters, the present invention provides a simple and easily controllable scheme of recording identification information on a hologram tape or film. As described above, such information specific to each hologram may be recorded on the film simultaneously with the hologram duplication in a simplified manner. No separate step or equipment, such as additional printing steps or an additional light source, is required. Furthermore, by recording identification information adjacent to each hologram, detailed identification and/or history of each hologram can be recognized easily.

Reference will now be made in detail to the preferred embodiments/working examples of the present invention, examples of which are illustrated in the accompanying drawings.

As described above, a recording method for a hologram-recorded film of the present invention includes the following variations:

(1) A reflection type LCD device is disposed at the position corresponding to the identification information recording area in the master hologram plate.

(2) A reflective plate is disposed in the position corresponding to the identification information recording area in the master hologram plate.

In the exposure duplication method of scheme (1), a hologram recording film is coupled with the master hologram plate directly, or via a transparent substance disposed therebetween, and laser beams irradiate the master hologram plate to form multiple duplicates of the master hologram in the recording film. A reflective mask of a reflection type LCD device, which is controlled by a computer or the like, is provided in the master hologram plate adjacent to the master hologram to be duplicated. A reflective plate is disposed on the back side (opposite to the viewing side) of the LCD device. A reflective hologram or the like as well as a standard aluminum plate may be used as the reflective plate. Laser beams for the hologram duplication irradiate the display region of the LCD device to record information corresponding to the reflective pattern of the LCD device in the recording film. Alternatively, additional laser beams different from the laser beams for the hologram duplication may be used to record the information.

In exposure duplication method (2) above, a hologram-recording film is coupled with the master hologram plate directly, or via a transparent substance disposed therebetween, and laser beams irradiate the master hologram plate to form multiple duplicates of the hologram original in the recording film. An aluminum reflective plate or the like having a reflective area is provided in the master hologram plate adjacent to the hologram to be duplicated, and the laser beams for the hologram duplication irradiate the reflective area at the time of hologram duplication. In this method, the laser beams are radiated through a transmission mask of a transmission type LCD device, which is controlled by a computer or the like, to record information corresponding to the transparent pattern of the LCD device in the hologram-recording film. Alternatively, additional laser beams different from the laser beams for the hologram duplication may irradiate the reflective area to record the information.

As a modification of this method, light capable of inactivating the hologram-recording film, such as ultraviolet rays or the like, may be radiated towards the reflective area through the transmission mask of the transmission LCD device (which is controlled by a computer or the like) in advance, and thereafter laser beams for the hologram duplication may irradiate the reflective area to record the information corresponding to the opaque pattern of the transmission type LCD device in the recording film. Alternatively, additional laser beams different from the laser beams for the hologram duplication may be used to record the information.

Working examples of the present invention will be described with reference to the attached drawings.

First Working Example

FIG. 1 is a schematic view of a reflection master hologram plate 1 to be used in this working example. In the reflection master hologram plate 1, a reflection master hologram 2 to be duplicated, such as a Lippmann hologram or the like, is recorded, and a reflection type LCD device 3 is disposed adjacent the master hologram 2. The reflection type LCD device 3 is controlled by a control computer 4 so that the displayed information may be varied at any time.

Figure 2:
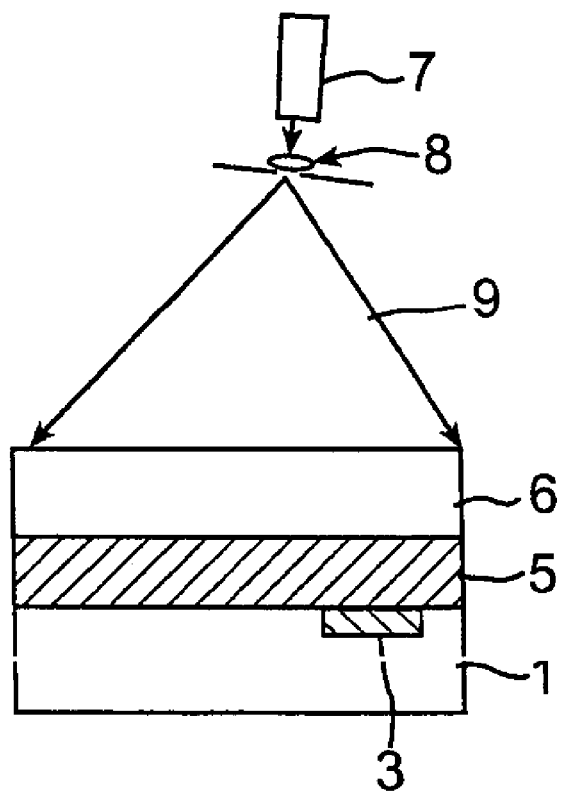
FIG. 2 is a schematic view of the optical arrangement for the recording method according to the first working example of the present invention.

The master plate 1 was disposed in an optical arrangement as shown in FIG. 2 to duplicate the reflection hologram 2 on a hologram recording film 6. The reflection master hologram plate 1 was coupled with the hologram recording film 6 (a film of DuPont's photo-polymer, OMNIDEX 706, for example) via an optical contact liquid 5 (xylene, for example) disposed therebetween. Laser light from an argon laser 7 (wavelength: 514.5 nm) was converted into scattered light 9 through an optical system 8, and was directed towards the recording film 6 to expose it. In this condition, the reflected and diffracted light from the reflection hologram 2 and the incident light generated interference in the film 6 so that the desired hologram was duplicated in the recording film 6. In this process, the scattered light 9 also reached the reflection type LCD device 3 disposed in the plate 1, and generated interference between the reflected light from the device 3 and the incident light on the film 6. Thus, the desired identification information corresponding to the reflective pattern formed by the liquid crystal device 3 was recorded in the film 6 at the same time as hologram duplication.

Second Working Example

In the first working example above, in order to record the identification information on the film 6, the reflection type LCD device 3 was disposed in the reflection master hologram plate 1. The present working example differs from the first working example in that a simple reflective area is provided in the master hologram plate at a position corresponding to identification information to be recorded on a recording film, and a transmission type LCD device is disposed on the incident side of the scattered light 9 to record the desired identification information on the film.

Figure 3:
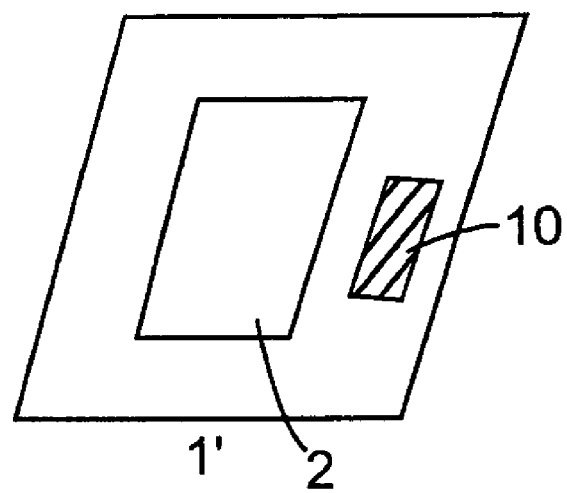
FIG. 3 is a schematic view of a reflection master hologram plate to be used in a recording method for a hologram-recorded film according to a second working example of the present invention.

As shown in FIG. 3, a reflective area formed of an aluminum reflecting mirror 10, which is to be used for recording identification information, was provided in the peripheral non-hologram region of a reflection master hologram plate 1', which has a reflection master hologram 2 to be duplicated, such as a Lippmann hologram, in its center region. In place of the aluminum reflecting mirror 10, a reflection hologram plate may also be used. In this case, the reflection master hologram plate 1' may be integrated with such a reflection hologram plate for recording the identification information.

Figure 4:
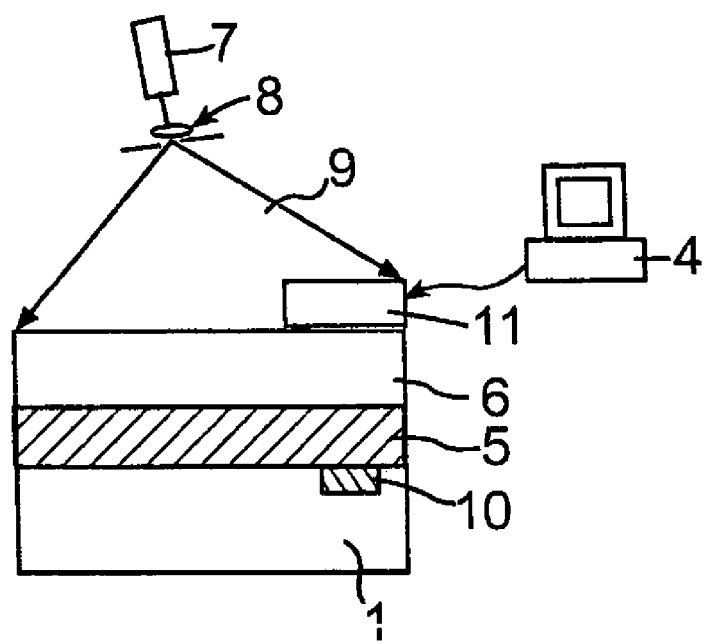
FIG. 4 is a schematic view of the optical arrangement for the recording method according to the second working example of the present invention.

The plate 1' was disposed in an optical arrangement as shown in FIG. 4 to duplicate the reflection master hologram 2 on a hologram-recording film 6. The optical contact liquid 5, the hologram-recording film 6, the laser 7, and other elements carrying the same reference numerals as in the first working example were the same as those in the first working example. The reflection master hologram plate 1' was coupled with the hologram-recording film 6 through the optical contact liquid 5 disposed therebetween. A transmission type LCD device 11 was disposed above the recording film 6 at the position corresponding to the reflecting mirror 10. Light from the argon laser 7 was converted into scattered light 9 through the optical system 8, and irradiated the recording film 6 to expose it. The reflected and diffracted light from the reflection hologram 2 and the incident light generated interference in the recording film 6 so that the desired hologram was duplicated in the film 6. In this process, the scattered light 9 that had passed through the mask of the transmission LCD device 11 reached the reflecting mirror 10 disposed in the plate 1', and induced interference between the reflected light from the reflecting mirror 10 and the incident light on the film 6. Thus, the desired identification information corresponding to the transmission pattern of the transmission LCD device 11 was recorded in the film 6 at the same time as hologram duplication.

As a modification of this example, transmission LCD device 11 may be incorporated in an ultraviolet radiation device for radiating ultraviolet light. In this case, the pattern formed by the LCD device 11 is projected onto the recording film 6 made of a photo-polymer to inactivate the portion of the polymer irradiated by the ultraviolet radiation. (The inactivate portion corresponds to the projected pattern.) Thereafter, the scattered light 9 from the laser 7 is radiated towards the entire surface of the recording film 6 to duplicate the master hologram 2 and to record the identification information that corresponds to the projected non-transmission pattern of the transmission LCD device 11 at the same time.

In the working examples described above, the reflection hologram 2 in the reflection master hologram plates 1 and 1' may be any known reflection hologram, including, but not limited to, hologram combiners for head-up displays, and diffusion reflection holograms, which the present applicant has proposed in Japanese Patent Application No. 7-312362, for example. Furthermore, in the alternative to such reflection type holograms, a master plate for holography, which the present applicant has proposed in Japanese Patent Application No. 7-181698 and which comprises transparent blocks each having an original for holography sealed therein, may be used.

The hologram-recorded film and the recording method for the same of the present invention have been described hereinabove with reference to the embodiments and the working examples as above. However, the invention is not whatsoever limited to those examples, and encompasses various changes and modifications.

As can be understood from the description hereinabove, according to the present invention providing a hologram-recorded film and a recording method for the same, it is easy to record the identification (or specific) information, such as a serial number or the like, in the film in which holograms are intermittently recorded. Furthermore, according to the present invention, such identification information substantially specific to each hologram recorded therein can be recorded at the same time as the hologram duplication in a simple manner without requiring any separate step of printing or the like and without requiring any additional light source. Such identification information recorded in the film along with each hologram may be used to facilitate identification and/or history tracking of the individual holograms.

It will be apparent to those skilled in the art that various modifications and variations can be made in the hologram film and the method for manufacturing the same of the present invention without departing from the spirit or scope of the invention. Thus, it is intended that the present invention cover the modifications and variations of this invention provided they come within the scope of the appended claims and their equivalents.

What is claimed is:

1. A method for producing on a hologram recording tape a plurality of volume-type main-holograms, each of the plurality of main-holograms being substantially the same, and a plurality of volume-type sub-holograms formed in the hologram recording tape, each one of the plurality of volume-type sub-holograms being disposed adjacent a respective one of the plurality of volume-type main-holograms, each one of the plurality of volume-type sub-holograms being different from all others of the plurality of volume-type sub-holograms, comprising the steps of:

coupling the hologram recording tape with a master hologram plate comprising a reflective area adjacent to the main-hologram to be duplicated; and irradiating the master hologram plate with a laser beam to form multiple duplicates of the master hologram in the hologram recording tape;

wherein each of the volume-type sub-holograms being formed in the hologram recording tape by a laser beam at the same time or sequentially and in a different area than the respective one of the main-holograms and each of the plurality of sub-holograms indicating information substantially specific to each of the plurality of volume-type main-holograms corresponding to an image in the reflective element.

2. The method according to claim 1, wherein each of the plurality of volume-type main-holograms is formed at a predetermined interval in the hologram recording tape.

3. The method according to claim 1, wherein each of the plurality of volume-type sub-holograms indicates a serial number of the adjacent respective one of the plurality of adjacent hologram.

4. The method according to claim 1, wherein the hologram recording tape comprises a photo-polymer.

5. The method according to claim 1, wherein each of the plurality of volume-type main-holograms comprises a hologram combiner.

6. The method according to claim 1, wherein each of the plurality of volume-type main-holograms comprises a diffusion reflection hologram.

7. A method for producing on a hologram recording tape a plurality of main-holograms, each of the plurality of main-holograms being substantially the same, and a plurality of sub-holograms formed in the hologram recording tape, each one of the plurality of sub-holograms being disposed adjacent a respective one of the plurality of the main-holograms, each one of the plurality of sub-holograms being different from all others of the plurality of sub-holograms, comprising the steps of:

coupling the hologram recording tape with a master hologram plate; and irradiating the master hologram plate with a laser beam to form multiple duplicates of the master hologram in the hologram recording tape;

wherein a mask of a liquid crystal diode device is provided in the master hologram plate adjacent to the master hologram to be duplicated such that irradiating the liquid crystal diode device records information corresponding to the pattern of the liquid crystal diode device in the recording tape within the plurality of the sub-holograms.

8. The method according to claim 7, wherein each of the plurality of the main-holograms is formed at a predetermined interval in the hologram recording tape.

9. The method according to claim 7, wherein each of the plurality of the sub-holograms indicates a serial number of the adjacent respective one of the plurality of adjacent hologram.

10. The method according to claim 7, wherein the hologram recording tape comprises a photo-polymer.

11. The method according to claim 7, wherein each of the plurality of main-holograms comprises a hologram combiner.

12. The method according to claim 7, wherein each of the plurality of main-holograms comprises a diffusion reflection hologram.

* * * * *